United States Patent
Gundavelli et al.

(10) Patent No.: US 11,303,558 B2
(45) Date of Patent: Apr. 12, 2022

(54) ULTRA-RELIABLE LOW LATENCY COMMUNICATIONS (URLLC) SUPPORT FOR WIRELESS ACCESS

(71) Applicant: Cisco Technology, Inc., San Jose, CA (US)

(72) Inventors: Srinath Gundavelli, San Jose, CA (US); Alberto Rodriguez Natal, Mountain View, CA (US); Fabio R. Maino, Palo Alto, CA (US); Pradeep Kumar Kathail, Los Altos, CA (US); Sangram Kishore Lakkaraju, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 16/737,199

(22) Filed: Jan. 8, 2020

(65) Prior Publication Data
US 2021/0211373 A1    Jul. 8, 2021

(51) Int. Cl.
*H04L 12/761* (2013.01)
*H04W 76/15* (2018.01)
(Continued)

(52) U.S. Cl.
CPC .......... *H04L 45/16* (2013.01); *H04L 61/2084* (2013.01); *H04L 61/255* (2013.01);
(Continued)

(58) Field of Classification Search
CPC ...... H04L 45/16; H04L 61/255; H04W 76/15; H04W 88/12; H04W 84/12; H04W 88/08
See application file for complete search history.

(56) References Cited

U.S. PATENT DOCUMENTS

2015/0074741 A1* 3/2015 Janakiraman ......... H04L 63/101
726/1
2017/0332359 A1 11/2017 Tsai et al.
(Continued)

FOREIGN PATENT DOCUMENTS

| EP | 3703466 A1 | 9/2020 |
|---|---|---|
| WO | 2018064182 A1 | 5/2018 |
| WO | WO2019084725 A1 | 5/2019 |

OTHER PUBLICATIONS

Popovski, Petar et al. Wireless Access in Ultra-Reliable Low Latency Communication (URLLC), Researchgate.net (Oct. 26, 2018) (arXiv:1810.06938v1 [cs.IT] Oct. 16, 2018).
(Continued)

*Primary Examiner* — Yaotang Wang
(74) *Attorney, Agent, or Firm* — Merchant & Gould P.C.

(57) ABSTRACT

Low latency wireless communications may be provided. A client device may be authorized for a first association in response to the client device making a first concurrent association request that may include a first Media Access Control (MAC) address. In response to authorizing the client device for the first association, an Endpoint Identifier (EID) associated with the client device may be registered with a first Routing Locator (RLOC) in a map server, the first RLOC being associated with the first MAC address. The client device may then be authorized for a second association in response to the client device making a second concurrent association request that includes a second MAC address. In response to authorizing the client device for the second association, the EID associated with the client device may be registered with a second RLOC in the map server, the second RLOC being associated with the second MAC address.

20 Claims, 4 Drawing Sheets

(51) Int. Cl.
*H04L 29/12* (2006.01)
*H04L 45/16* (2022.01)
*H04L 61/255* (2022.01)
*H04L 61/5084* (2022.01)
*H04W 84/12* (2009.01)
*H04W 88/08* (2009.01)
*H04W 88/12* (2009.01)

(52) U.S. Cl.
CPC .......... *H04W 76/15* (2018.02); *H04W 84/12* (2013.01); *H04W 88/08* (2013.01); *H04W 88/12* (2013.01)

(56) References Cited

U.S. PATENT DOCUMENTS

| | | | |
|---|---|---|---|
| 2018/0039505 A1* | 2/2018 | Lin | G06F 16/2455 |
| 2018/0139133 A1* | 5/2018 | Makhijani | H04W 60/005 |
| 2018/0184444 A1 | 6/2018 | Li et al. | |
| 2018/0367288 A1* | 12/2018 | Vrzic | H04W 36/0069 |
| 2019/0045533 A1 | 2/2019 | Chatterjee et al. | |
| 2020/0260457 A1 | 8/2020 | Sun et al. | |

OTHER PUBLICATIONS

Notification of Transmittal of the International Search Report and the Written Opinion issued in International Application No. PCT/US202/067665, dated Mar. 24, 2021; (15 pages).

Coudron, Matthieu Cross-layer Cooperation to Boost Multipath TCP Performance in Cloud Networks, 2013, IEEE 2nd International Conference on Cloud Networking (CloudNet) Nov. 11, 2013; (9 pages).

Southeast Univeristy Authentication by Physical Layer Features draft-linning-authentication-pysical-layer-00; Internet Draft; Internet Engineering Task Force; [retrieved on Oct. 9, 2018] (7 pages).

Brockners, F. et al. "Requiremetn for In-situ OAM" Internet Draft, Mar. 13, 2017, Internet Enginerring Task Force, IETF, Standard working Draft, Internet Society (ISOC) Geneva, Switzerland, [retrieve on Mar. 13, 2017] (24 pages).

* cited by examiner

ULTRA-RELIABLE LOW LATENCY COMMUNICATIONS (URLLC) SUPPORT FOR WIRELESS ACCESS

TECHNICAL FIELD

The present disclosure relates generally to low latency wireless communications.

BACKGROUND

In computer networking, a wireless Access Point (AP) is a networking hardware device that allows a wireless compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where wireless access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
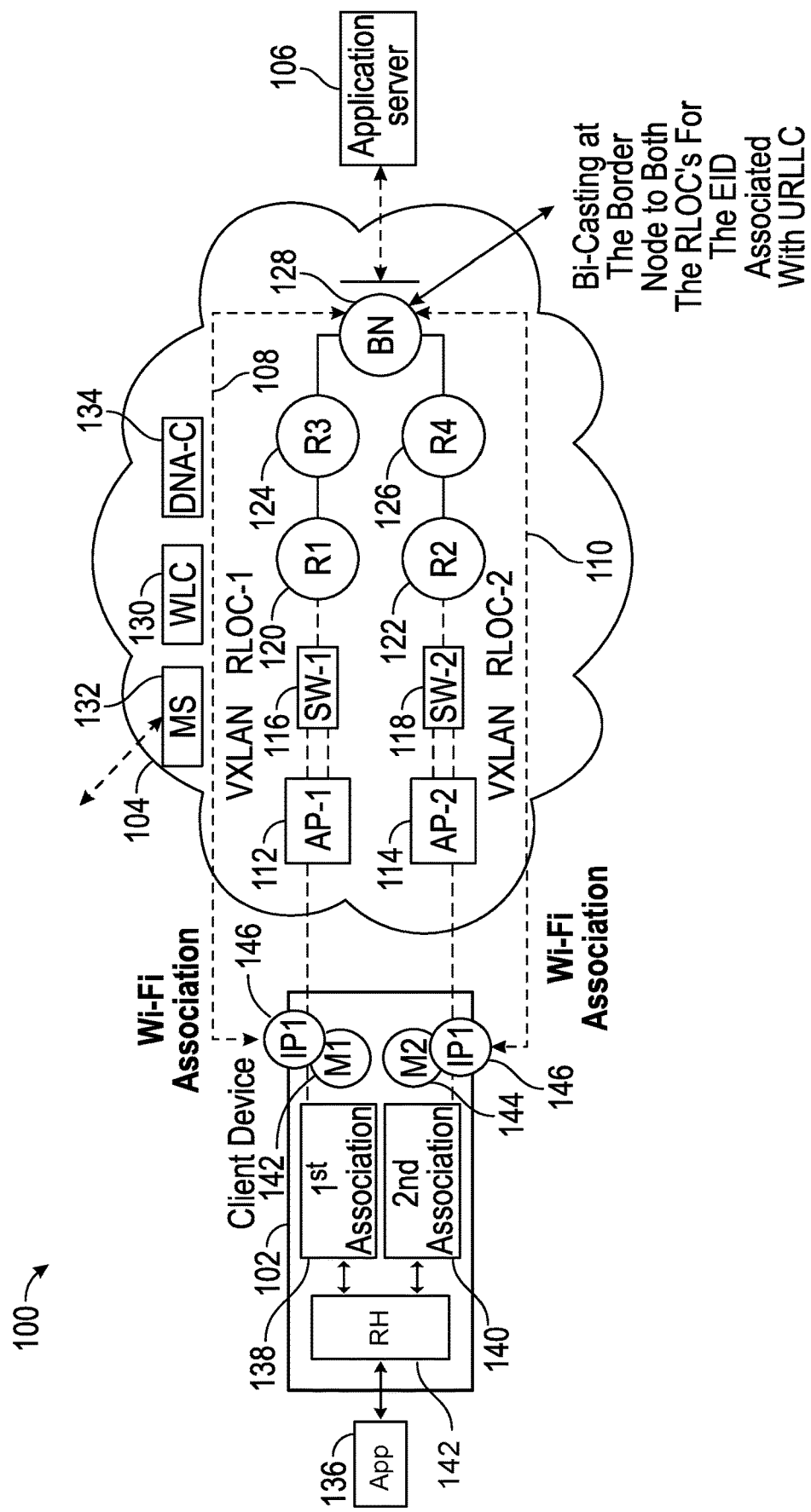
FIG. 1 is a block diagram of an operating environment.

Low latency wireless communications may be provided. A client device may be authorized for a first association in response to the client device making a first concurrent association request that may include a first Media Access Control (MAC) address. In response to authorizing the client device for the first association, an Endpoint Identifier (EID) associated with the client device may be registered with a first Routing Locator (RLOC) in a map server, the first RLOC being associated with the first MAC address. The client device may then be authorized for a second association in response to the client device making a second concurrent association request that includes a second MAC address. In response to authorizing the client device for the second association, the EID associated with the client device may be registered with a second RLOC in the map server, the second RLOC being associated with the second MAC address.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

According to the 3rd Generation Partnership Project (3GPP) Release 15 5G-NR, Ultra-Reliable Low-Latency Communication (URLLC) is a set of features that provide low latency and ultra-high reliability for applications such as industrial internet, smart grids, factory automation, autonomous driving, remote surgery, and intelligent transportation systems. These applications may require, for example, sub-millisecond latency with error rates that are lower than 1 packet loss in $10^5$. Supporting URLLC applications for wireless (e.g., Wi-Fi) access may require new approaches for packet delivery. These approaches should meet the stringent URLLC requirements around packet loss and latency metrics on an air interface and in an access network.

Embodiments of the disclosure may provide a process for supporting URLLC capabilities for wireless (e.g., Wi-Fi) access based on a network fabric data plane. For example, embodiments of the disclosure may allow a wireless client device to establish concurrent Wi-Fi associations (e.g., two or more) either to a same Access Point (AP), or to different APs by using multiple Media Access Control (MAC) addresses. These MAC addresses may have been generated by the client device, or may have been obtained from a network function. Embodiments of the disclosure may allow the client device to obtain a same Internet Protocol (IP) address or different IP addresses for each of those associations. Furthermore, embodiments of the disclosure may extend a Software Defined Access (SDA) architecture for supporting URLLC capabilities. For example, a simulcasting property may be introduced in a map server for an Endpoint Identifier (EID) associated with the URLLC connection. This may allow a border node and other switches or routers to bi-cast the traffic to more than one Routing Locator (RLOC) at the same time.

Network fabric will now be described. The complexity in networks may come from policies being tied to network constructs such as IP addresses, VLANs, ACLs, etc. In order to address these complexities, an enterprise network may be divided into two different layers, each for different objectives. One layer may be dedicated to the physical devices and forwarding of traffic (known as an underlay), and another virtual layer (known as an overlay) may be where wired and wireless users and devices may be logically connected together, and services and policies may be applied. This may provide a separation of responsibilities and may maximize the capabilities of each layer while simplifying deployment and operations since a change of policy may only affect the overlay, and the underlay may not be touched. The combination of an underlay and an overlay may be referred to as a network fabric.

As referenced above, SDA may comprise an intent-based networking solution for an enterprise. An intent-based network may treat the network as a single system that may provide the translation and validation of business intent (or goals) into the network and may return actionable insights. SDA may provide automated end-to-end services (e.g., segmentation, quality of service, and analytics) for user, device, and application traffic. SDA may automate user policy so organizations may ensure the appropriate access control and application experience may be set for any user or device to any application across the network. This may be accomplished with a single network fabric across LAN and WLAN, which may create a consistent user experience, anywhere, without compromising security. SDA benefits may include, but are not limited to: i) automation (e.g., plug-and-play for simplified deployment of new network devices, along with consistent management of wired and wireless network configuration provisioning); ii) policy (e.g., automated network segmentation and group-based policy; iii) assurance (e.g., contextual insights for fast issue resolution and capacity planning; and iv) integration (e.g., open and programmable interfaces for integration with third-party solutions).

By allowing a Wi-Fi client device to establish concurrent wireless associations and by introducing a simulcasting property in a mapping system (and in combination with efficient Wi-Fi6 radios for example), the Wi-Fi client device may receive packets from multiple paths (i.e., that same packets may be received over different paths), thus reducing packet loss and packet delays and meeting the URLLC requirements. In other words, embodiments of the disclosure may stitch an end-to-end system for providing a URLLC capability to wireless access by providing a logic for extending the mapping system (e.g., LISP mapping system) for realizing simulcasting and leveraging dynamic MAC address usage and concurrent Wi-Fi associations. With this approach, embodiments of the disclosure may provide a URLLC capability to wireless access in SDA. This, in conjunction with Institute of Electrical and Electronic Engineers (IEEE) 802.11ax compliant radios for example, may provide a powerful tool for enabling delay and loss-sensitive communications over wireless access.

FIG. 1 shows an operating environment 100. Operating environment 100 illustrates an example topology with configured routers and switches. Networks may be deployed in other topologies consistent with embodiments of the disclosure. As shown in FIG. 1, operating environment 100 may comprise a client device 102, a network 104, and an application server 106. Network 104 may include a first pathway 108 and a second pathway 110 over which packets may be bi-casted (i.e., simulcasted). Network 104 may comprise a first Access Point (AP) 112, a second AP 114, a first switch 116, a second switch 118, a first router 120, a second router 122, a third router 124, a fourth router 126, and a border node 128. Consistent with embodiments of the disclosure, first pathway 108 may be established between border node 128 and client device 102 over first AP 112, first switch 116, first router 120, and third router 124. Similarly, second pathway 110 may be established between border node 128 and client device 102 over second AP 114, second switch 118, second router 122, and fourth router 126. Network 104 may be controlled by Wireless Local Area Network Controller (WLC) 130 that may query map server 132 and Digital Network Architecture Controller (DNA-C) 134 as described in greater detail below.

Consistent with embodiments of the disclosure, an application 136 may be running on client device 102. Application 136 may be a URLLC application configured to support concurrent wireless associations. Client device 102 may establish a first association 138 with first AP 112. Similarly, client device 102 may establish a second association 140 with second AP 114. First association 138 may have a first MAC address 142 (e.g., M1) and second association 140 may have a second MAC address 144 (e.g., M2). First association 138 and second association 140 may share the same IP address 146 (also called an Endpoint Identifier (EID)) (e.g., IP1).

Client device 102 and application server 106 may comprise, but are not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device. First AP 112 and second AP 114 may provide wireless access to network 104 for client device 102 and may operate using the IEEE 802.11 standard for example.

Embodiments of the disclosure may allow client device 102 to establish concurrent wireless (e.g., Wi-Fi) associations (e.g., first association 138 and second association 140) to different APs (e.g., first AP 112 and second AP 114) by using multiple MAC addresses (e.g., first MAC address 142 and second MAC address 144). These MAC addresses may have been generated by client device 102, or may have been obtained from a network function such as WLC 130 or DNA-C 134. Embodiments of the disclosure may allow client device 102 to obtain a same EID (e.g., IP address 146) for both first association 138 and second association 140. Furthermore, embodiments of the disclosure may provide a simulcasting property introduced by map server 132 for an EID associated with a URLLC connection for example. This may allow border node 128 and other switches or routers in network 104 to bi-cast the traffic to more than one RLOC at the same time.

An RLOC may comprise, for example, an IPv4 or IPv6 address of an Egress Tunnel Router (ETR). An RLOC may be obtained from the output of an EID-to-RLOC mapping lookup in map server 132. An EID may comprise, for example, an IPv4 or IPv6 address used in the source and destination address fields of the first (i.e., most inner) Locator/ID Separation Protocol (LISP) header of a packet. An ETR may comprise a device that is a tunnel endpoint and may accept an IP packet where the destination address in the "outer" IP header in one of its own RLOCs. An Ingress Tunnel Router (ITR) may comprise a device that is a tunnel start point. The ITR may receive IP packets from site end-systems on one side and may send IP packets (e.g., encapsulated using LISP headers or similar encapsulation headers such as VXLAN or GRE) across a network to an ETR on the other side. The terms ITR and ETR may be reversed for the up link traffic from the client. In some deployments, LISP devices may act both as ITR and ETR depending on the direction of the traffic (and may be referred to as xTRs). In the example shown in FIG. 1, first pathway 108 may comprise a tunnel with an ITR comprising border node 128 and an ETR comprising first switch 116 with a first RLOC (e.g., RLOC-1). Similarly, second pathway 110 may comprise a tunnel with an ITR comprising border node 128 and an ETR comprising second switch 118 with a second RLOC (e.g., RLOC-2).

Consistent with embodiments of the disclosure, client device 102 running URLLC application 136 may be configured to support concurrent wireless associations (i.e., first association 138 and second association 140). These associations may be to the same or a different APs. Client device 102 may present a unique MAC address (e.g., M1 and M2) for each association. Client device 102 may present a URLLC indication (e.g., URLLC-CAPABILITY-REQUEST) in the respective association and/or in authorization procedures.

The embodiments described in the present disclosure may be compatible with the case where the two MACs used by the UE (e.g., client device) are attached behind the same switch (through two APs connected to the same switch or through one AP with two associations with the UE). In that scenario, the EID of the UE may be associated with a single RLOC (the single switch) and regular LISP operation may happen to deliver packets to the switch without the need to use bi-casting over the LISP network. Packet replication and bi-casting may happen at the switch itself (in the case of two APs connected to the switch) or at the AP (in the case of an AP with two associations with the UE).

When requesting, for example, an IPv4/IPv6 address, client device 102 may include a URLLC request tag in the DHCPv4/DHCPv6 or other address assignment procedures. Network 104 may ensure the same IP address (i.e., EID) is given to both of the URLLC associations. For example, first association 138 may have a MAC and an IP address {M1, IP1} and second association 140 may have a MAC and an IP address {M2, IP1}. This may allow application 136 on client device 102 to bind to a single IP address.

WLC 130 may register the EID entry (e.g., IP1) in map server 132 with an indication that the EID is an URLLC address (i.e., client device 102 has presented the URLLC indication). Border node 128 and other xTR functions may receive two RLOC entries for the same EID {IP1: RLOC-1, RLOC-2}, marked with the URLLC indication attribute. Application 136 running on client device 102 may associate to a logical interface using both first association 138 and second association 140.

Border node 128, on receiving a packet from application server 106, may see if there is a cache entry for that EID (i.e., the destination IP address of the packet). If there is no cache entry, border node 128 may make a query to the map server 132. Map server 132 may return both of the RLOCs (i.e., RLOC-1 and RLOC-2) and with a special indication that the EID is a URLLC address and that the packet should be bi-casted to both of the RLOCs associated with the EID address.

Because of the URLLC indication on the retrieved mapping, border node 128 may duplicate the packet addressed towards the EID, encapsulate each copy with outer destination addresses of RLOC 1 and RLOC2 respectively, and send the copies over both first pathway 108 and second pathway 110 to RLOC-1 and RLOC-2. First switch 116 with RLOC-1 receiving the packet may send it to client device 102's MAC address M1 (i.e., first association 138). Second switch 118 with RLOC-2 receiving the packet may send it to client device 102's MAC address M2 (i.e., second association 140).

URLLC capable client device 102 may have a Redundancy Handler (RH) 142 function. For example, application 136 running on client device 102 may keep receiving multiple packets on both first pathway 108 and second pathway 110. Application 136 may drop the duplicate packets and may use a single copy. This RH 142 function may take care of packet duplication on the up link path, and duplicate removal in the down link path. For up link traffic, RH 142 function may duplicate the packets and send it on both first pathway 108 and second pathway 110. Border node 128 may drop the duplicate packet and may do so by maintaining a hash of the last "n" packets, and comparing it with a current packet's hash.

The elements described above of operating environment 100 (e.g., client device 102, application server 106, first AP 112, second AP 114, first switch 116, second switch 118, first router 120, second router 122, third router 124, fourth router 126, border node 128, WLC 130, map server 132, and DNA-C 134) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
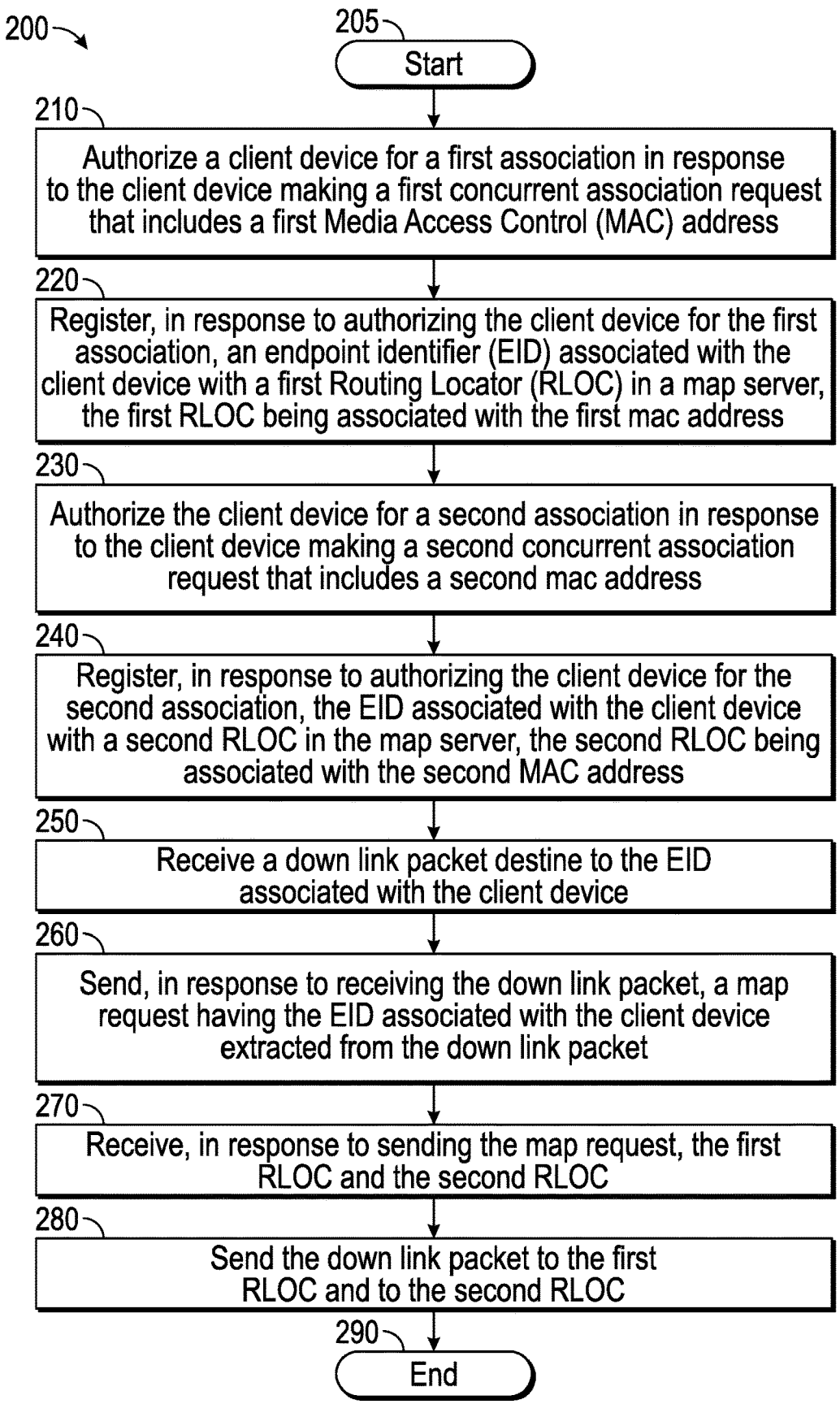
FIG. 2 is a flow chart of a method for providing low latency wireless communications.
Figure 3:
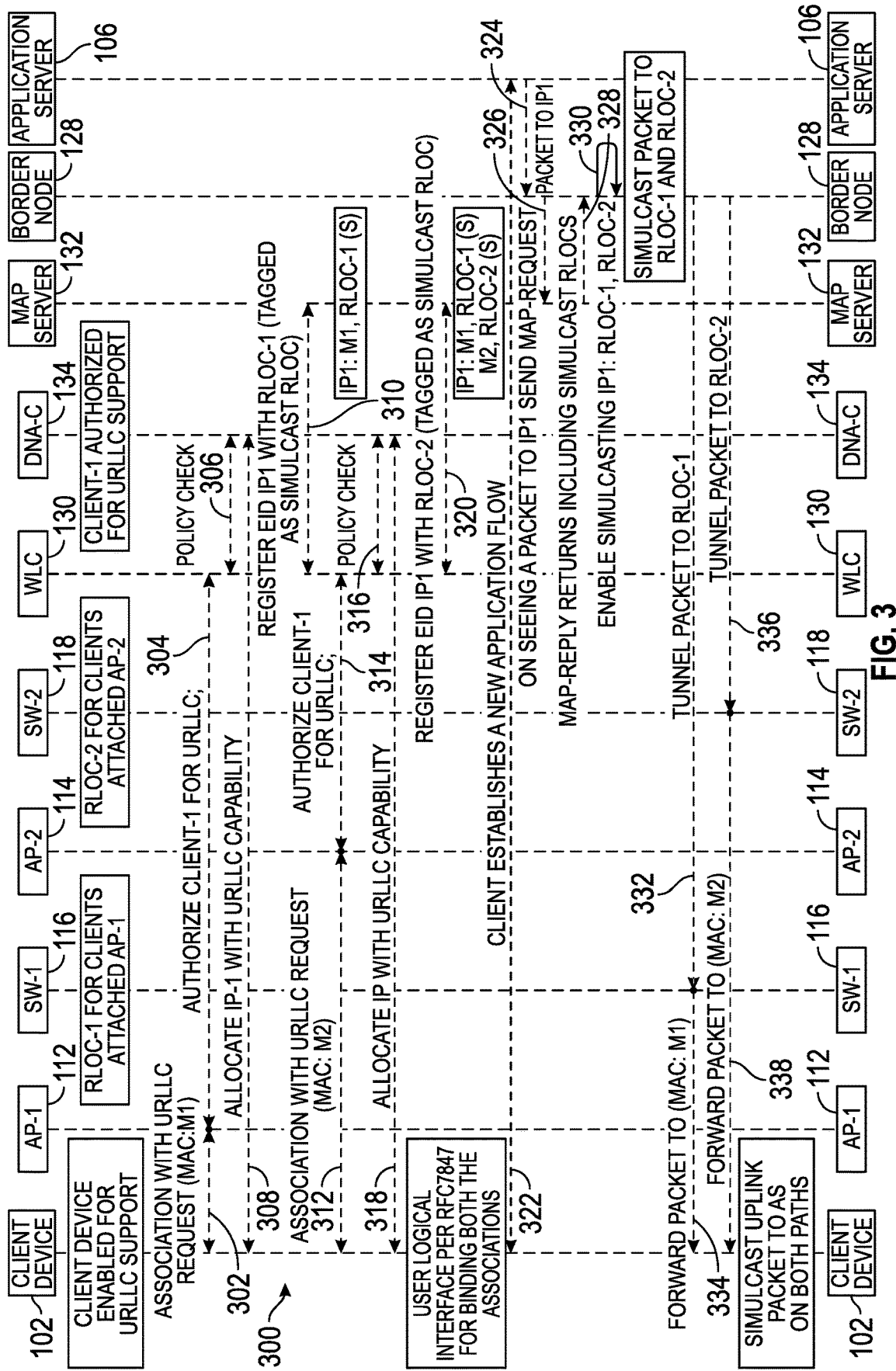
FIG. 3 is a flow diagram of a method for providing low latency wireless communications.

FIG. 2 is a flow chart setting forth the general stages involved in a method 200 consistent with embodiments of the disclosure for providing low latency wireless communications. While method 200 describes the down link direction, the processes described herein may be used for both up link and down link packets consistent with embodiments of the disclosure. Method 200 may be implemented using, for example, WLC 130 and border node 128 as described in more detail above with respect to FIG. 1. A flow diagram 300 in FIG. 3 will be used to explain the stages of FIG. 2. Ways to implement the stages of method 200 will be described in greater detail below.

Method 200 may begin at starting block 205 and proceed to stage 210 where WLC 130 may authorize client device 102 for first association 138 in response to client device 102 making a first concurrent association request that includes first MAC address 142 (e.g., M1). For example, application 136 may be running on client device 102 and may comprise a URLLC application configured to support concurrent wireless associations. Client device 102 may send the first concurrent association request to first AP 112 (stage 302). The first concurrent association request may indicate it is a URLLC request and it may include first MAC address 142. In response to the first concurrent association request, first AP 112 may request authorization from WLC 130 to allow first association 138. WLC 130 may grant the requested authorization (stage 304). After a policy check (stage 306) from WLC 130, DNA-C 134 may allocate an EID (i.e., IP address 146 (e.g., IP1)) with URLLC capability to client device 102 for first association 138 (stage 308).

From stage 210, where WLC 130 authorizes client device 102 for first association 138 in response to client device 102 making the first concurrent association request that includes first MAC address 142, method 200 may advance to stage 220 where WLC 130 may register, in response to authorizing client device 102 for first association 138, the EID (i.e., IP address 146 (e.g., IP1)) associated with client device 102 with a first RLOC (e.g., RLOC-1) in map server 132 (stage 310). The first RLOC may be associated with first MAC address 142. For example, WLC 130 may register the EID entry (i.e., IP1) in map server 132 with an indication (e.g., "S" for simulcast) that the EID is a URLLC address (i.e., that client 102 has presented a URLLC indication). This entry in map server 132 may also include first MAC address 142 for first association 138 and the first RLOC (e.g., RLOC-1) for first switch 116 because first association 138 is with first AP 112, which is connected to first switch 116. For example, the entry in map server 132 may comprise:

IP1:

M1, RLOC-1 (S).

Once WLC 130 registers the EID in map server 132 in stage 220, method 200 may continue to stage 230 where WLC 130 may authorize client device 102 for second association 140 in response to client 102 device making a second concurrent association request that includes second MAC address 144 (e.g., M2). For example, application 136 may be running on client device 102 and may comprise a URLLC application configured to support concurrent wireless associations. Client device 102 may send the second concurrent association request to second AP 114 (stage 312). The second concurrent association request may indicate it is a URLLC request and it may include second MAC address 144. In response to the second concurrent association request, second AP 114 may request authorization from WLC 130 to allow second association 140. WLC 130 may grant the requested authorization (stage 314). After a policy check (stage 316) from WLC 130, DNA-C 134 may allocate the EID (i.e., IP address 146 (e.g., IP1)) with URLLC capability to client device 102 for second association 140 (stage 318).

After WLC 130 authorizes client device 102 for second association 140 in response to client device 102 making the second concurrent association request that includes second MAC address 144 in stage 230, method 200 may proceed to stage 240 where WLC 130 may register, in response to authorizing client device 102 for the second association, the EID (i.e., IP address 146 (e.g., IP1)) associated with client device 102 with a second RLOC (e.g., RLOC-2) in map server 132 (stage 320). The second RLOC may be associated with second MAC address 144. For example, WLC 130 may register the EID entry (i.e., IP1) in map server 132 with an indication (e.g., "S" for simulcast) that the EID is a URLLC address (i.e., that client 102 has presented a URLLC indication). This entry in map server 132 may also include second MAC address 144 for second association 140 and the second RLOC (e.g., RLOC-2) for second switch 118 because second association 140 is with second AP 114, which is connected to second switch 118. For example, the entry in map server 132 may now comprise:

IP1:

M1, RLOC-1 (S)

M2, RLOC-2 (S)

From stage 240, where WLC 130 registers the EID (i.e., IP address 146 (e.g., IP1)) in map server 132, method 200 may advance to stage 250 where border node 128 may receive a down link packet destined to the EID (i.e., IP address 146 (e.g., IP1)) associated with client device 102. For example, client device 102 may use a logical interface (e.g., per RFC7847) for binding first association 138 and second association 140 and may establish a new application flow between client device 102 and application server 106 (stage 322). Consistent with embodiments of the disclosure, client device 102 may also have an RH functionality as described above. Then border node 128 may receive the down link packet from application server 106 (stage 324).

Once border node 128 receives the down link packet in stage 250, method 200 may continue to stage 260 where border node 128 may send, in response to receiving the down link packet, a map request having the EID associated with client device 102 extracted from the down link packet. For example, border node 128 may send the map request to map server 132 (stage 326).

From stage 260, where border node 128 sends the map request, method 200 may advance to stage 270 where border node 128 may receive, in response to sending the map request, the first RLOC (e.g., RLOC-1) and the second RLOC (e.g., RLOC-2). For example, map server 132, upon receiving the map request may make a query to the map server 132 using the EID (i.e., IP address 146 (e.g., IP1)). In response, map server 132 may return both the RLOCs (i.e., the first RLOC (e.g., RLOC-1) and the second RLOC (e.g., RLOC-2)) to border node 128 in a map reply (stage 328). The map reply may also include a special indication that the EID is a URLLC address and that border node 128 should bi-cast the down link packet to both of the RLOCs associated with the EID address. Stages 260 and 270 may be skipped if border node 128 already has an entry for the EID in its cache because the RLOCs for the destination EID may already be available in the local cache.

After border node 128 receives the first RLOC (e.g., RLOC-1) and the second RLOC (e.g., RLOC-2) in stage 270, method 200 may proceed to stage 280 where border node 128 may send the down link packet to the first RLOC and to the second RLOC. For example, border node 128 may enable simulcasting of packets to IP address 146 (e.g., IP1) corresponding to client device 102 through RLOC-1 and through RLOC-2 (stage 330). Border node 128 may tunnel a copy of the down link packet to first switch 116 at RLOC-1 (stage 332). From first switch 116, the copy of the down link packet may be forwarded to client device 102 through first AP 112 (stage 334). Similarly, border node 128 may tunnel a copy of the down link packet to second switch 118 at RLOC-2 (stage 336). From second switch 118, the copy of the down link packet may be forwarded to client device 102 through second AP 114 (stage 338). Similarly, up link packets may be simulcasted over first pathway 108 and second pathway 110 from client device 102 to application server 106. Once border node 128 sends the down link packet in stage 280, method 200 may then end at stage 290.

Accordingly, by allowing client device 102 to establish concurrent wireless associations and by introducing a simulcasting property in a mapping system, client device 102 may receive packets from multiple pathways, thus reducing packet loss and packet delays and meeting the URLLC requirements. In other words, embodiments of the disclosure may provide an end-to-end system for providing a URLLC capability to wireless access by providing a logic for extending the mapping system for realizing simulcasting and leveraging dynamic MAC address usage and concurrent Wi-Fi associations for example. With this approach, embodiments of the disclosure may provide a URLLC capability to wireless access in SDA. This may provide a powerful tool for enabling delay and loss-sensitive communications over wireless access.

Figure 4:
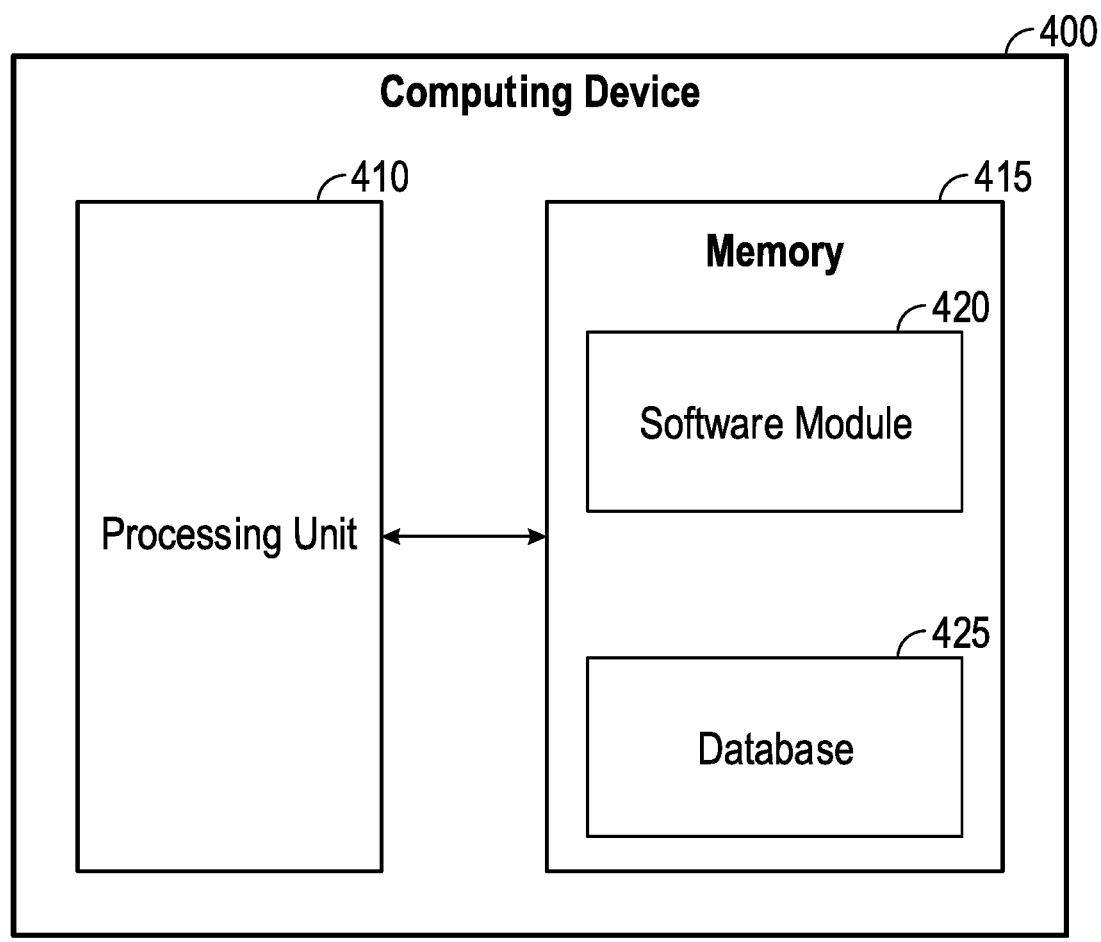
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing low latency wireless communications as described above with respect to FIG. 2. Computing device 400, for example, may provide an operating environment for client device 102, application server 106, first AP 112, second AP 114, first switch 116, second switch 118, first router 120, second router 122, third router 124, fourth router 126, border node 128, WLC 130, map server 132, or DNA-C 134. Client device 102, application server 106, first AP 112, second AP 114, first switch 116, second switch 118, first router 120, second router 122, third router 124, fourth router 126, border node 128, WLC 130, map server 132, and DNA-C 134 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   authorizing, by a first computing device, a client device for a first association in response to the client device making a first concurrent association request that includes a first Media Access Control (MAC) address;
   registering, in response to authorizing the client device for the first association, an Endpoint Identifier (EID) associated with the client device with a first Routing Locator (RLOC) in a map server, the first RLOC being associated with the first MAC address;

authorizing the client device for a second association in response to the client device making a second concurrent association request that includes a second MAC address; and
registering, in response to authorizing the client device for the second association, the EID associated with the client device with a second RLOC in the map server, the second RLOC being associated with the second MAC address, wherein the client device obtains a same EID for both the first association and the second association.

2. The method of claim 1, further comprising:
receiving, by a second computing device, a down link packet destined to the EID associated with the client device;
sending, in response to receiving the down link packet, a map request having the EID associated with the client device extracted from the down link packet;
receiving, in response to sending the map request, the first RLOC and the second RLOC; and
sending the down link packet to the first RLOC and to the second RLOC.

3. The method of claim 2, wherein receiving the down link packet destined to the EID associated with the client device comprises receiving the packet from an application server.

4. The method of claim 2, wherein the second computing device is configured to drop a duplicate up link packet.

5. The method of claim 2, wherein the second computing device comprises a border node.

6. The method of claim 1, further comprising sending, by the client device, an up link packet on a first path corresponding to the first RLOC and on a second path corresponding to the second RLOC.

7. The method of claim 6, wherein the client device further comprises a redundancy handler configured to duplicate the up link packet and send it on the first path corresponding to the first RLOC and the second path corresponding to the second RLOC.

8. The method of claim 1, wherein authorizing the client device for the first association further comprises authorizing the client device for the first association with a first Access Point (AP).

9. The method of claim 1, wherein authorizing the client device for the second association further comprises authorizing the client device for the second association with a second AP.

10. The method of claim 1, wherein:
authorizing the client device for the first association further comprises authorizing the client device for the first association with a first AP; and
authorizing the client device for the second association further comprises authorizing the client device for the second association with the first AP.

11. The method of claim 1, wherein the first computing device comprises a Wireless Local Area Network Controller (WLC).

12. The method of claim 1, wherein the EID comprises an Internet Protocol Address of the client device.

13. A system comprising:
a memory storage; and
a processing unit coupled to the memory storage, wherein the processing unit is operative to:
authorize a client device for a first association in response to the client device making a first concurrent association request that includes a first Media Access Control (MAC) address;
register, in response to authorizing the client device for the first association, an Endpoint Identifier (EID) associated with the client device with a first Routing Locator (RLOC) in a map server, the first RLOC being associated with the first MAC address;
authorize the client device for a second association in response to the client device making a second concurrent association request that includes a second MAC address; and
register, in response to authorizing the client device for the second association, the EID associated with the client device with a second RLOC in the map server, the second RLOC being associated with the second MAC address, wherein the client device obtains a same EID for both the first association and the second association.

14. The system of claim 13, wherein the processing unit being operative to authorize the client device for the first association further comprises the processing unit being operative to authorize the client device for the first association with a first Access Point (AP).

15. The system of claim 14, wherein the processing unit being operative to authorize the client device for the second association further comprises the processing unit being operative to authorize the client device for the second association with a second AP.

16. The system of claim 13, wherein:
the processing unit being operative to authorize the client device for the first association further comprises the processing unit being operative to authorize the client device for the first association with a first AP; and
the processing unit being operative to authorize the client device for the second association further comprises the processing unit being operative to authorize the client device for the second association with the first AP.

17. A non-transitory computer-readable medium that stores a set of instructions which when executed perform a method comprising:
authorizing, by a first computing device, a client device for a first association in response to the client device making a first concurrent association request that includes a first Media Access Control (MAC) address;
registering, in response to authorizing the client device for the first association, an Endpoint Identifier (EID) associated with the client device with a first Routing Locator (RLOC) in a map server, the first RLOC being associated with the first MAC address;
authorizing the client device for a second association in response to the client device making a second concurrent association request that includes a second MAC address; and
registering, in response to authorizing the client device for the second association, the EID associated with the client device with a second RLOC in the map server, the second RLOC being associated with the second MAC address, wherein the client device obtains a same EID for both the first association and the second association.

18. The non-transitory computer-readable medium of claim 17, further comprising:
receiving, by a second computing device, a down link packet destined to the EID associated with the client device;
sending, in response to receiving the down link packet, a map request having the EID associated with the client device extracted from the down link packet;

receiving, in response to sending the map request, the first RLOC and the second RLOC; and sending the down link packet to the first RLOC and to the second RLOC.

19. The non-transitory computer-readable medium of claim 18, wherein receiving the down link packet destined to the EID associated with the client device comprises receiving the packet from an application server.

20. The non-transitory computer-readable medium of claim 18, wherein the second computing device is configured to drop a duplicate up link packet.

* * * * *